(12) United States Patent
Terentiev

(10) Patent No.: US 7,516,648 B2
(45) Date of Patent: Apr. 14, 2009

(54) APPARATUS AND METHODS FOR LEAK DETECTION IN BIOPROCESSING BAGS

(75) Inventor: Alexandre N. Terentiev, Lexington, KY (US)

(73) Assignee: LevTech, Inc., Lexington, KY (US)

( * ) Notice: Subject to any disclaimer, the term of this patent is extended or adjusted under 35 U.S.C. 154(b) by 0 days.

(21) Appl. No.: 11/689,761

(22) Filed: Mar. 22, 2007

(65) Prior Publication Data

US 2007/0220956 A1      Sep. 27, 2007

Related U.S. Application Data

(63) Continuation of application No. PCT/US2007/064492, filed on Mar. 21, 2007.

(60) Provisional application No. 60/784,615, filed on Mar. 22, 2006.

(51) Int. Cl.
*G01M 3/40* (2006.01)
*B65D 30/08* (2006.01)

(52) U.S. Cl. ............... 73/40; 73/52; 383/12; 383/101; 383/109; 383/113

(58) Field of Classification Search ............... 73/52, 73/40; 383/12, 13, 101, 109, 113
See application file for complete search history.

(56) References Cited

U.S. PATENT DOCUMENTS

| | | | |
|---|---|---|---|
| 5,225,812 A * | 7/1993 | Faghri | 340/605 |
| 5,477,155 A | 12/1995 | Proulx et al. | |
| 5,824,882 A | 10/1998 | Griebel et al. | |
| 7,176,030 B2 * | 2/2007 | Faries et al. | 436/1 |
| 2006/0081036 A1 * | 4/2006 | Lehmann | 73/49.3 |

* cited by examiner

*Primary Examiner*—David A. Rogers
(74) *Attorney, Agent, or Firm*—King & Schickli, PLLC

(57) ABSTRACT

An apparatus detects a leak of an electrically conductive fluid from a disposable plastic bag used in mixing applications, such as during bioprocessing in a sterile environment. In one embodiment, the bag is associated with a sensor for detecting a leak from an interior compartment. The sensor may be arranged to detect either a leak internal to the at least two material layers of the bag or external to the outer layer, or both. Related methods are also disclosed.

19 Claims, 4 Drawing Sheets

APPARATUS AND METHODS FOR LEAK DETECTION IN BIOPROCESSING BAGS

This application is a continuation of International Application PCT/US07/64492, filed Mar. 21, 2007, which claims the benefit of U.S. Provisional Patent App. Ser. No. 60/784,615, filed Mar. 22, 2006, the disclosures of which are both incorporated herein by reference.

TECHNICAL FIELD

The present invention relates generally to fluid processing and, more particularly, to apparatus and methods for detecting leaks that may result during the processing of fluids under sterile conditions.

BACKGROUND OF THE INVENTION

Many manufacturers of products requiring a temporary holding, mixing or other fluid processing step as part of the manufacturing process now opt to use disposable bags for holding and contacting the fluid under sterile conditions instead of rigid mixing tanks or vessels. Advantageously, such bags are relatively inexpensive to manufacture, easy to transport, store, and sterilize, and can be disposed of once the operation is complete and any product recovered. Moreover, the use of such bags not only both eliminates the need for cleaning and the chance for cross-contamination, but also reduces the overall process cost.

A frequent problem encountered by users of such bags, which are typically made of one or more layers of thin, fluid-impervious plastic film, is the risk of undesirable leakage. In the case of bioprocessing applications, such leaks result in the loss of sterility inside the bag or the release of potentially hazardous biological material. If not detected, such leakage can thus compromise the entire mixing operation and render the end product unsuitable for use. However, early detection of such leakage can advantageously lead to appropriate corrective action being taken, such as before the end product is distributed.

Up to now, leakage in these types of processing bags has been difficult to detect in a reliable fashion. Usually, such leakage is discovered visually in the form of wetness on the outside surface of the bag, spills on the floor and so on. Of course, this method of detection is not reliable, since such wetness may result from the condensation on the bag outer surface, and unidentified spills can arise from other sources. Also, many leaks cannot be detected visually if the bag is kept in the closed non-transparent container.

In the particular case of bioprocessing, most of the biological fluids held, stored or processed in bags comprise liquids, such as water based electrolytes, that are relatively good electrical conductors. The material comprising the bag, on the other hand, is typically polyethylene or other plastic which is very good electrical insulator. The bags containing biological fluids can have just one layer of plastic film or several layers of film. In the latter case, the fluid touching layer of the bag usually has the best leachable and extractable characteristics to minimize the contamination of the processed fluid with molecules diffised out of the plastic to the fluid. This layer is typically low density polyethylene. However, this innermost layer has poor mechanical strength, and thus one or more additional layers are added to enhance the mechanical strength of the bag.

The external layer(s) are not supposed to touch the processed fluid but provide for the mechanical strength of the bag. Even though those layers are also sterile on the inner side, they may leach substantial amount of organic molecules if they contact fluid as a result of the internal leak. Consequently, the leaks that can develop in the bags can be of two types:

1. Internal leaks where the electrically conductive fluid in the interior compartment of the bag through only one or several layers of the film but does not leak outside of the bag; or 2. External leaks, where the conductive fluid leaks to the outside non-sterile environment.

Both types of leaks can potentially contaminate the product in the bag and thus are highly undesirable.

Accordingly, a need exists for an expedient, yet reliable manner for detecting either or both of these types of leaks, thereby allowing for immediate corrective action to be taken.

SUMMARY OF THE INVENTION

In accordance with a first aspect of the invention, an apparatus intended for use in at least temporarily holding an electrically conductive fluid in need of processing under sterile conditions is provided. The apparatus comprises a plastic bag having a first interior compartment capable of receiving the conductive fluid for processing under sterile conditions. The apparatus further includes a rigid container having a second interior compartment for at least partially receiving and supporting the bag. A sensor is provided for sensing the presence of a leak of the conductive fluid from the first interior compartment, which can thus be used to indicate the potential lack of sterility in the interior compartment and allow for immediate corrective action.

In one embodiment, the sensor comprises first and second electrodes. The second electrode is arranged external to the first interior compartment and capable of being connected to the first electrode contacting the conductive fluid by the leak. Preferably, the sensor flirter includes a generator of AC or DC voltage and a detector connected to the first and second electrodes for detecting the current flowing in the resulting circuit in the presence of a leak.

The first electrode may project through a hermetic seal formed in the sidewall of the bag, in which case the bag may include a tubular port for receiving the first electrode. Still more preferably, the tubular port includes a connector for allowing the first electrode to contact the conductive fluid under sterile conditions. The rigid support container may at least partially comprises a conductive material forming the second electrode.

In another embodiment, the bag comprises a first layer of material arranged for forming the first interior compartment and a second layer of material adjacent the first layer of material. Preferably, the sensor comprises first and second electrodes for positioning at least partially between the first and second layers of material. Alternatively, one of the first and second electrodes comprises the second layer of material of the bag.

In accordance with another aspect of the invention, a further apparatus intended for use in at least temporarily holding an electrically conductive fluid in need of processing under sterile conditions and detecting a leak thereof is disclosed. This apparatus comprises a plastic processing bag having a first interior compartment capable of receiving the conductive fluid under sterile conditions, and an at least partially conductive support structure includes a second interior compartment for at least partially receiving the plastic processing bag. An electrode connected to the conductive fluid in the first interior compartment is arranged to form an electrical circuit with the conductive support structure in the presence of the leak. To facilitate leak detection, a generator of AC or DC voltage and a detector for detecting the current flow in the resulting circuit may be connected to the electrode and the conductive support structure.

In accordance with still a further aspect of the invention, an apparatus is intended for use in at least temporarily holding an electrically conductive fluid in need of processing and detecting a leak thereof. The apparatus comprises a processing bag comprising a first layer of flexible material creating an interior compartment capable of receiving the conductive fluid under sterile conditions and a second layer of flexible material adjacent the first layer. First and second electrodes arranged external to the interior compartment are arranged so as to be capable of being connected by the leak. At least the first electrode extends at least partially between the first and second layers of flexible material.

In one embodiment, both of said first and second electrodes are between the first and second layers of flexible material. However, it is also possible to make the second layer of flexible material and the second electrode unitary. The second electrode may also comprise a rigid container for receiving and supporting the bag.

In accordance with yet another aspect of the invention, a method of processing fluid under sterile conditions is described. The method comprises providing a plastic processing bag having a first interior compartment creating a sterile environment placing the bag in a support structure having a second interior compartment, providing an electrically conductive fluid to the interior compartment, and providing a sensor for detecting the presence of a leak of the conductive fluid from the first interior compartment.

In one embodiment, the providing step further includes providing first and second electrodes capable of being connected by the leak, and the method further includes connecting a generator of AC or DC voltage and a detector for detecting current flow in the resulting circuit to the first and second electrodes. Preferably, the support structure is at least partially conductive, and the step of providing first and second electrodes comprises providing the first electrode in contact the conductive fluid in the first interior compartment and using the support structure as the second electrode. In the case where the bag comprises first and second layers of material, the providing step may instead comprise positioning the first and second electrodes external to the first interior compartment and at least partially between the first and second layers of material.

DETAILED DESCRIPTION OF THE INVENTION

As noted above, the present invention relates primarily to apparatus and methods for leak detection. A particularly advantageous use of the inventive apparatus and methods is in connection with bioprocessing applications where fluid conductors, electrically conductive biological fluids (typically liquids comprising or consisting essentially of water), are at least temporarily held in thin-walled, flexible or collapsible vessels, such as for example disposable bags made of one or more layers of plastic film. As noted above, this type of vessel can advantageously be disposed of once the operation is complete and any product recovered. This type of arrangement thus not only both eliminates the need for cleaning and the chance for cross-contamination, but also reduces the overall process cost.

Figure 1:
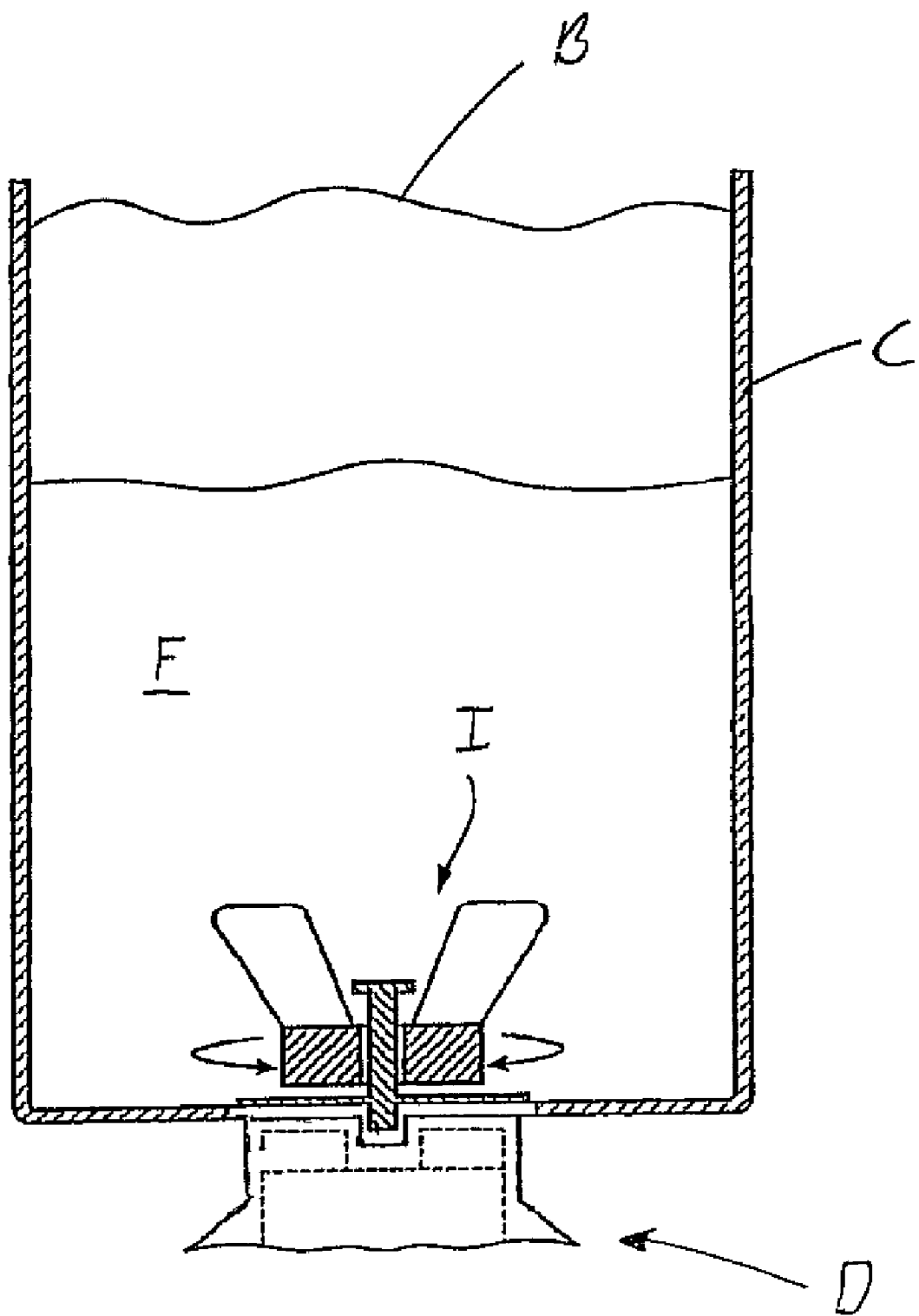
FIG. 1 is a schematic diagram of a mixing arrangement including a bag in a rigid support container for possible use with fluids under sterile conditions.

A particularly preferred use of such a processing bag is in a fluid mixing system. As shown in FIG. 1, the bag B is positioned in the interior compartment of a rigid container C that serves as a support structure. The bag B further includes an interior compartment adapted for receiving and at least temporarily holding an electrically conductive fluid F and, most preferably, a biologically active liquid. The volume of the bag B is generally greater than one liter, and preferably on the order of 10 to 1,000 liters.

Means for agitating the fluid in the bag B, such as a magnetic impeller I rotated by an external motive device D may also be provided, as shown. Alternatively or in addition, the fluid agitating means may comprise a sparger (not shown) for introducing a gas into the bag B. Additional details of such fluid-agitating means may be found in commonly assigned, co-pending U.S. patent application Ser. No. 11/304,417, the disclosure of which is incorporated herein by reference.

One exemplary apparatus 10 for detecting leaks in such a bag B, which is especially important when the sterility of the interior compartment must he maintained, is now described with reference to FIG. 2. As illustrated, the apparatus 10 includes a leak sensor or means for sensing a leak comprising at least one (and preferably only one) electrically conductive electrode 12 associated with the bag B (which, although not shown, may include the agitating means, such as the impeller I of FIG. 1). In this first embodiment, this electrode 12 penetrates the corresponding wall of the bag B such that one end at least partially contacts the liquid inside and the other end is positioned external to the interior compartment. However, as will be described below, it is not necessary for the electrode 12 to penetrate the sidewall of the bag B in order to make contact with the fluid F, even if the sterile conditions are to be maintained.

In this embodiment, the sensor further comprises a second electrode (alternately referred to as a conductor for purposes of clarity) also forming part of the sensor or means for sensing, but external to the interior compartment of the bag B. Preferably, this second electrode or conductor comprises a conductive material forming at least part of a supportive structure for the bag B, such as a rigid container 14. This container 14 is preferably formed entirely of a rigid, conductive material, such as stainless steel. The container 14 is arranged such that it least partially and preferably fully receives the bag B, both when it is empty (that is, before the fluid is introduced) and also when filled. Although shown spaced apart in FIG. 2 for purposes of clear differentiation, it should be appreciated that, when the bag B is filled with liquid, the interior surface of the container 14 is normally in intimate contact with external or outer surface of the bag (see, e.g., bag B and container C in FIG. 1).

The sensor or sensing means of the apparatus 10 as illustrated for purposes of this preferred embodiment further comprises: (1) a generator 16 capable of generating DC (Direct current) or AC (Alternating current) voltage (e.g., a battery or alternator); and (2) a detector 18 capable of detecting DC or AC electric current. Suitable connections, such as by wires, interconnect the electrode 12, container 14, generator 16, and detector 18 so as to form a circuit, the purpose of which is outlined further in the following description.

Figure 2:
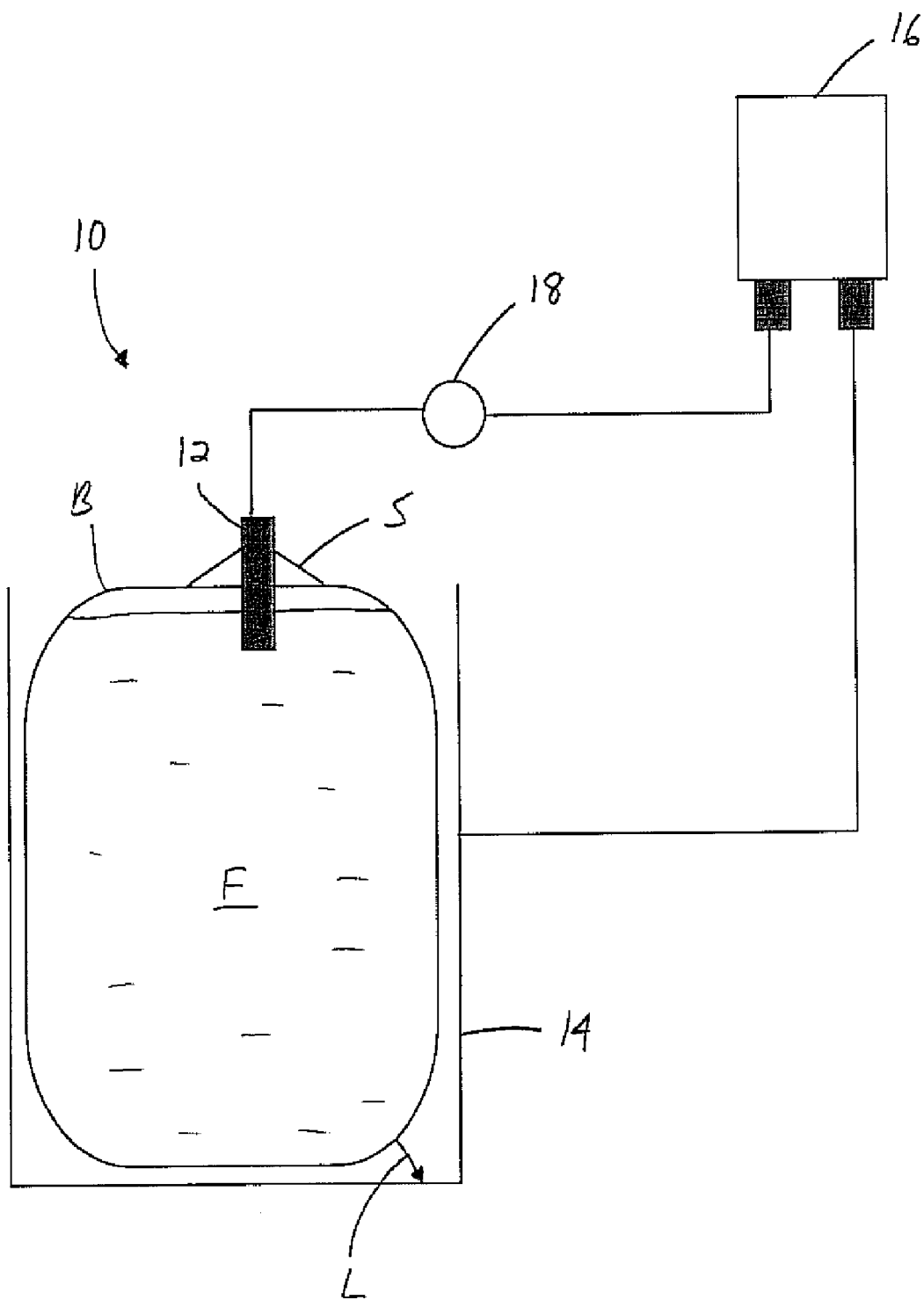
FIG. 2 is a schematic diagram of a leak detection apparatus forming one aspect of the present invention.

In a simple embodiment, and as shown in FIG. 2, the first electrode 12 comprises an elongated piece of metal material (and preferably one that is corrosion-resistant, such as stainless steel). This electrode 12 may penetrate through the wall via a port of the bag B. An annular hermetic seal S between the rod serving as the electrode 12 and the port of the bag B may be provided to maintain the sterile interior environment typically desired. However, the electrode could take any other form that allows for the desired electrical contact with the conductor (e.g., container 14) to be established.

In one preferred mode of use and in accordance with the practice of a method of leak detection, the bag B is equipped with the electrode 12. As noted above, this may be accomplished by positioning the electrode 12 so that it penetrates through the selected sidewall of the bag B (such as the top wall) in a hermetic manner, as shown in FIG. 2. In any case, the result is that one end of the electrode 12 communicates with the interior, potentially sterile environment of the bag B and is at least partially in contact with the conductive fluid F or liquid. In contrast, the other end of the electrode 12 projects outside of the bag B or is otherwise in communication with the external environment. As a result of the connection noted above, the electrode 12 forming part of the sensor for purposes of this preferred first embodiment of the apparatus 10 allows electrical contact to be established between the generator 16 and the liquid held in the bag B.

As illustrated, the bag B associates intimately with the at least partly conductive container 14 and is filled with the selected liquid or other conductive fluid in need of mixing during the course of bioprocessing. One pole of the generator 16 is electrically connected to the electrode 12 at the outer (non-sterile) end. The other pole of the generator 16 is electrically connected to the conducting container 14 including the bag B. The electric current is measured in the circuit (which of course is normally open in the illustrated embodiment) using the detector 18.

If there is no leak through the wall of the bag B, there is no electrical continuity and thus no flow of electric current. In other words, the circuit including the electrode 12, container 14, generator 16, and detector 18 remains open. Electric current is not detected or registered, thus indicating a "no leak" state.

However, if a perforation or hole in the bag wall exists, the leaking liquid (note arrow L in FIG. 2) forms an electrical contact between the liquid in the bag B and container 14. This results in closed circuit through which electric current can flow from the generator 16 to the detector 18, which indicates the presence of the leak. Although not necessary for most applications, it may also be advantageous to pre-wet the exterior surface of the bag B, as this will help to ensure that the circuit is closed by even the smallest of leaks.

In the preferred embodiment, this detector 18 comprises a current measuring device, such as an amp meter (in which case one of the pole of the generator 16 connects to the electrode 12 or to the container 14, as shown in FIG. 2). However, any suitable indicator to alert a user to the leak, such by creating a visual or aural signal, may be used. The important point is that the presence of the leak is properly and promptly identified such that suitable ameliorative measures may be taken.

As should be appreciated, the generator 16 and detector 18 may be incorporated in one device (not shown). This device can simply measure the resistance of the circuit (which can of course be open or closed). In case of no leak (an open circuit), the resistance is very high. However, in case of a leak closing the circuit, the resistance would sharply drop and thereby indicate the presence of the leak.

Figure 3:
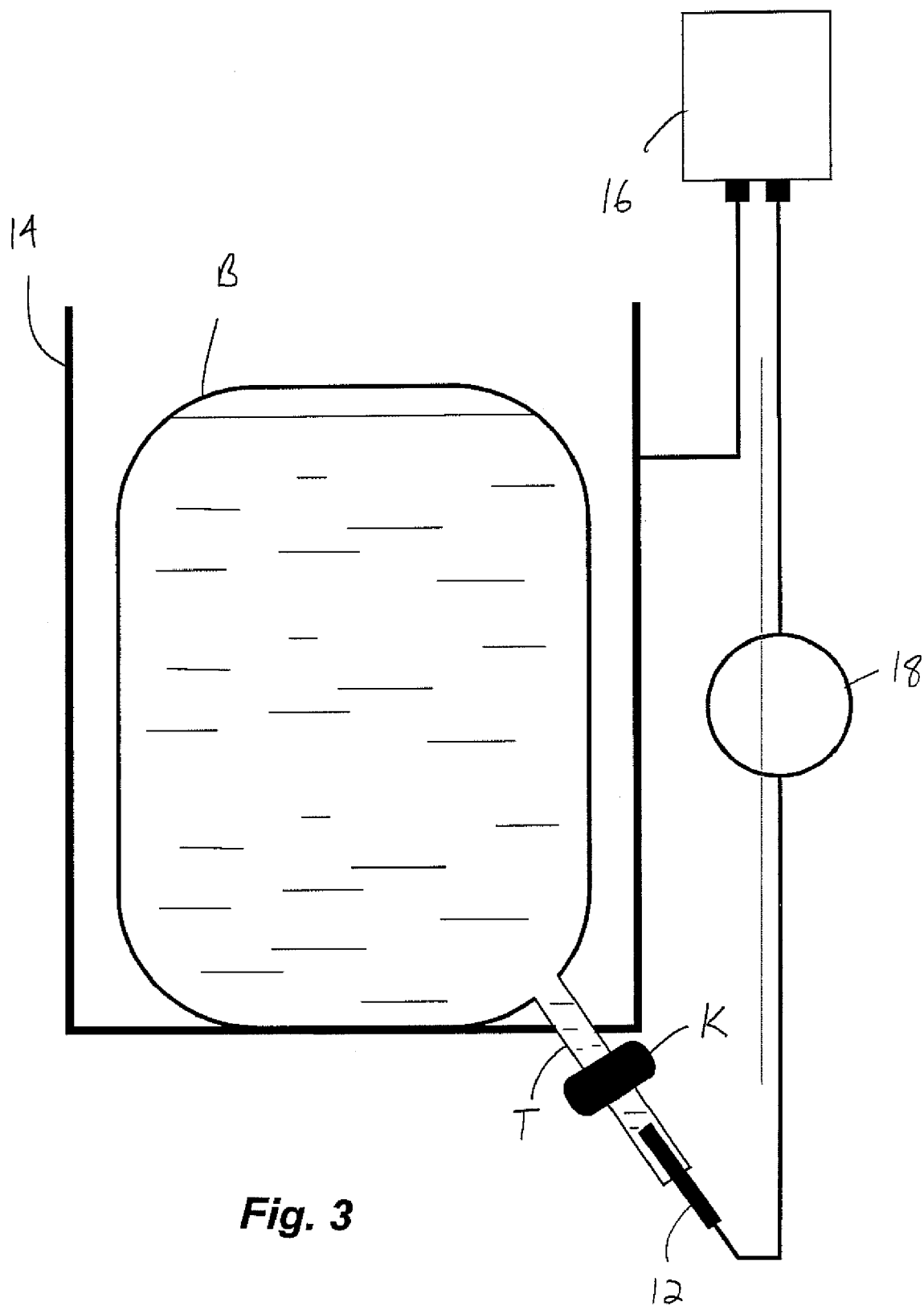
FIG. 3 is a schematic diagram illustrating an alternative embodiment of the leak detecting apparatus of FIG. 2.

As should be further appreciated, the electrode 12 can be pre-introduced during manufacturing, in which case it would become an integral part of the bag B. Accordingly, the electrode 12 should be capable to withstand the sterilization cycle performed on the bag B, such as Gamma radiation sterilization. Another options to sterilize the electrode 12 separately and introduce it via a tube T associated with a sterile connection device K (such as a KLEENPACK device of all Corporation or a BIOQUATE aseptic disposable connector, manufactured by BioQuate Inc.). In such case, as shown in FIG. 3, the electrode 12 may not project into the interior compartment of the bag B, despite making contact with the fluid F by way of the tube T.

As contrasted with external leaks, internal leaks develop when only one or several layers of material (e.g., plastic film) have holes or perforations, but the external layer remains intact. In this situation, the fluid may be not coming out of the bag to the external environment, but rather may accumulates between the layers. To detect this kind of leak, a leak detection apparatus 100 in accordance with another aspect of the invention is described.

Figure 4:
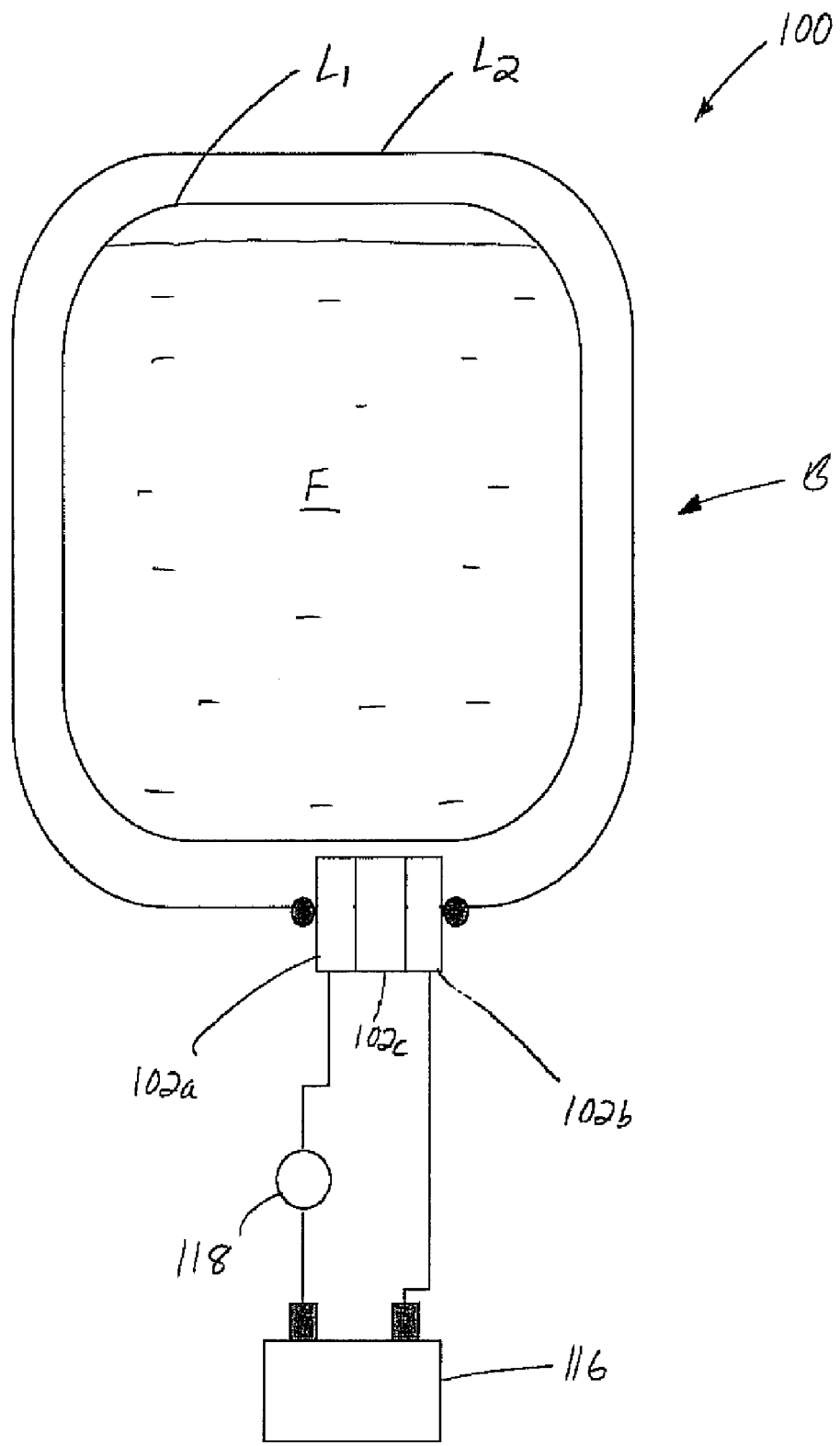
FIG. 4 is a schematic diagram of a leak detection apparatus forming another aspect of the present invention.

In the preferred second embodiment of the apparatus 100 for detecting internal leaks now being described, and with reference to FIG. 4, a sensor is associated with and preferably arranged between at least two internal and external layers of material forming $L_1$, $L_2$ of the bag B (which layers are normally in intimate contact, but are shown spaced apart for purposes of illustration). In one particularly preferred embodiment, as shown in FIG. 3 (in which the proportions may be considered altered for purposes of illustration), this sensor comprises at least two electrodes 102a, 102b that are spaced apart or otherwise not in electrical contact in the absence of a leak. This may be accomplished by separating the electrodes 102a, 102b by an insulator 102c (which if the second electrode 102b comprises a conductive support structure, like container 14, could be considered the bag B).

Preferably, as shown, the electrodes 102a, 102b are both between the layers $L_1$, $L_2$, but penetrate the external layer $L_2$ only. In other words, no part of the sensor is in contact with the interior of the bag B, which thus helps to ensure and maintain the desired sterile environment. Most preferably, the sensor is located along or adjacent a bottom portion of the bag B for reasons that will be better understood upon reviewing the following description.

As before, the apparatus 100 with the sensor further includes a generator 116 capable of generating DC (Direct current) or AC (Alternating current) voltage; and (2) a detector 118 capable of detecting DC or AC electric current. Suitable connections, such as by wires, interconnect the electrodes 102a, 102b, generator 116, and detector 118 so as to form a circuit (and preferably one that remains open in the absence of a leak from the internal layer $L_1$ in view of the initially isolated electrodes 102a, 102b).

In using this embodiment and a corresponding method, the sensor is initially such that no internal leak is detected. If the liquid leaks through the first (liquid touching) layer $L_1$ of the bag B, it may flow down toward the bottom portion of the bag B and make contact the electrodes 102a, 102b. Such contact closes the electric circuit such that current flow is established. Consequently, the detector 118 indicates the presence of the leak, such as by indicating the flow of electric current.

Summarizing the foregoing, apparatus 10 or 100 can be used to advantage in connection with bioprocessing applications where fluid conductors, such as electrically conductive biological fluids (typically liquids), are at least temporarily held in thin-walled, flexible or collapsible vessels, such as for example disposable bags made of one or more layers of plastic film. A sensor includes electrodes 12, 14 or 102a, 102b that may be connected by a leak, either internal to a multi-layered vessel or external thereto, to a generator 16, 116. An associated detector 18, 118 can detect the presence of the leak to allow for appropriate corrective action, thereby saving time and money.

The foregoing descriptions of various embodiments of the inventions are presented for purposes of illustration and description, and are not intended to be exhaustive or limiting. Modifications are possible in view of the teachings provided herein. For instance, the invention could be used in an arrangement where the sensor associated with the flexible vessel forms part of a normally closed circuit whereby the leak creates a short and thus opens the circuit. Additionally, both apparatus 10 and apparatus 100 may together for detecting internal and external leaks. More than one sensor may also be provided in either apparatus 10, 100. Also, instead of forming all or part of a container 14 serving as a support structure, the second electrode of the apparatus 10 may comprise a conducting mesh or like reticulated structure external to the bag B or another structure integrally formed with the bag (such as a metallized film). Although specifically proposed for use with a flexible plastic bag, the apparatus 10, 100 may be used in connection with any vessel having an interior compartment susceptible to leaking. The embodiments described provide the best illustration of the principles of the invention and its practical applications to thereby enable one of ordinary skill in the art to utilize the invention in various embodiments and with various modifications as are suited to the particular use contemplated.

The invention claimed is:

1. An apparatus intended for use in at least temporarily holding an electrically conductive fluid in need of processing under sterile conditions, comprising:
   a plastic bag having a first interior compartment capable of receiving the conductive fluid for processing under sterile conditions;
   a rigid container having a second interior compartment for at least partially receiving and supporting the bag; and
   a sensor for sensing the presence of a leak of the conductive fluid from the first interior compartment, said sensor comprising first and second electrodes, wherein the first electrode associates with an opening to the first interior compartment of the bag and said second electrode is arranged external to the first interior compartment for completing an electrical connection with the first electrode in the presence of the leak.

2. The apparatus of claim 1, wherein the sensor further includes a generator of AC or DC voltage and a detector connected to the first and second electrodes for detecting current in the resulting circuit when connected by the leak.

3. The apparatus of claim 1, wherein the first electrode projects through a hermetic seal associated with a sidewall of the bag.

4. The apparatus of claim 1, wherein the rigid support container at least partially comprises a conductive material forming the second electrode.

5. The apparatus of claim 1, wherein the bag includes a tubular port for receiving the first electrode.

6. The apparatus of claim 5, wherein the tubular port includes a connector for allowing the first electrode to contact the conductive fluid under sterile conditions.

7. The apparatus of claim 1, wherein the bag comprises a first layer of material arranged for forming the first interior compartment and a second layer of material adjacent the first layer of material.

8. The apparatus of claim 7, wherein the sensor comprises first and second electrodes are positioned at least partially between the first and second layers of material.

9. The apparatus of claim 7, wherein one of said first and second electrodes comprises the second layer of material of the bag.

10. An apparatus intended for use in at least temporarily holding an electrically conductive fluid in need of processing under sterile conditions and detecting a leak thereof, comprising:
    a plastic processing bag having a first interior compartment capable of receiving the conductive fluid under sterile conditions;
    an at least partially conductive support structure having a second interior compartment for at least partially receiving the plastic processing bag; and
    an electrode connected to the conductive fluid in the first interior compartment and arranged to form an electrical circuit with the conductive support structure in the presence of the leak.

11. The apparatus of claim 10, further including a generator of AC or DC voltage and a detector connected to the electrode and the conductive support structure for detecting a current in the electrical circuit.

12. An apparatus intended for use in at least temporarily holding an electrically conductive fluid in need of processing and detecting a leak thereof, comprising:
    a processing vessel comprising a first layer of flexible material creating an interior compartment capable of receiving the conductive fluid under sterile conditions and a second layer of flexible material adjacent the first layer;
    first and second electrodes arranged external to the interior compartment for completing an electrical connection with the first electrode in the presence of the leak, at least said first electrode extending at least partially between the first and second layers of flexible material, wherein said second layer of flexible material and the second electrode are unitary.

13. The apparatus of claim 12, wherein both of said first and second electrodes are between the first and second layers of flexible material.

14. The apparatus of claim 12, wherein said second electrode comprises a rigid container for receiving and supporting the processing vessel.

15. A method of processing fluid under sterile conditions, comprising:
    providing a processing bag having a first interior compartment creating a sterile environment;
    providing the bag with a support structure having a second interior compartment;
    providing an electrically conductive fluid in the interior compartment; and
    providing first and second electrodes capable of being connected by the leak, creating an electrical potential difference across the electrodes, and detecting the current flowing through the circuit formed by the presence of the leak,
    wherein the support structure is at Least partially conductive, and the step of providing first and second electrodes comprises providing the first electrode in contact the conductive fluid in the first interior compartment and using the support structure as the second electrode.

16. The method of claim 15, wherein the bag comprises first and second layers of material, and the providing step comprises positioning the first and second electrodes external to the first interior compartment and at least partially between the first and second layers of material.

17. An apparatus intended for use in at least temporarily holding an electrically conductive fluid in need of processing under sterile conditions, comprising:
- a flexible vessel having a first interior compartment capable of receiving the conductive fluid for processing under sterile conditions, said vessel comprising a first layer of material arranged for forming the first interior compartment and a second layer of material adjacent the first layer of material;
- a rigid container having a second interior compartment for at least partially receiving and supporting the flexible vessel; and
- a sensor for sensing the presence of a leak of the conductive fluid from the first interior compartment, wherein the sensor further comprises first and second electrodes, one of said first and second electrodes comprising the second layer of material of the vessel.

18. An apparatus intended for use in at least temporarily holding an electrically conductive fluid in need of processing and detecting a leak thereof, comprising:
- a processing vessel comprising a first layer of flexible material creating an interior compartment capable of receiving the conductive fluid under sterile conditions and a second layer of flexible material adjacent the first layer;
- first and second electrodes arranged external to the interior compartment for completing an electrical connection with the first electrode in the presence of the leak, at least said first electrode extending at least partially between the first and second layers of flexible material, wherein said second electrode comprises a rigid container for receiving and supporting the vessel.

19. The apparatus of claim 10, wherein the at least partially conductive support structure comprises a layer of the processing bag.

* * * * *

UNITED STATES PATENT AND TRADEMARK OFFICE
CERTIFICATE OF CORRECTION

PATENT NO. : 7,516,648 B2  Page 1 of 1
APPLICATION NO. : 11/689761
DATED : April 14, 2009
INVENTOR(S) : Alexandre N. Terentiev It is certified that error appears in the above-identified patent and that said Letters Patent is hereby corrected as shown below:

Claim 8, column 8, line 5, please delete "sensor comprises".

Claim 12, column 8, line 39, please delete "with the first electrode".

Signed and Sealed this

Fourth Day of August, 2009

JOHN DOLL
*Acting Director of the United States Patent and Trademark Office*